US006384931B1

(12) United States Patent
Brown et al.

(10) Patent No.: US 6,384,931 B1
(45) Date of Patent: May 7, 2002

(54) METHOD AND SYSTEM FOR CAPTURING DESTINATION ADDRESSES FROM LABEL DATA

(75) Inventors: Nanette Brown, Norwalk; Victor Girardi, Oxford; Paul A. Kovlakas, Milford, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/119,462

(22) Filed: Jul. 20, 1998

(51) Int. Cl.[7] .............................. B41J 15/00; B41J 5/30; B41J 3/42; B41B 15/00; G06F 17/00

(52) U.S. Cl. ....................... 358/1.18; 358/1.17; 358/1.1; 358/1.2; 358/1.12; 358/1.16; 400/62; 400/68; 400/72; 400/78; 235/375; 235/380

(58) Field of Search .............................. 400/62, 76, 68, 400/82; 358/1.18, 1.17, 1.9, 1.2, 1.12, 1.16; 235/375, 380

(56) References Cited

U.S. PATENT DOCUMENTS

| 4,858,907 A | 8/1989 | Eisner et al. |
| 4,875,174 A | 10/1989 | Olodort et al. ............. 364/519 |

(List continued on next page.)

FOREIGN PATENT DOCUMENTS

| DE | 92 19 115 U | 1/1998 |
| EP | 0 496 575 | 7/1992 |
| EP | 0 603 095 | 6/1994 |
| EP | 0 780 803 | 6/1997 |
| WO | WO 97/14117 | 4/1997 |

OTHER PUBLICATIONS

No Author, "Escher Group Announces Universal Postal Client—Product to Replace Postage Meter Hardware with Internet Software Solution"; Oct. 1997; PR Newswire, p1006NEMO49; DialogWeb copy pp. 1–3.

*Primary Examiner*—Edward Coles
*Assistant Examiner*—Twyler Lamb
(74) *Attorney, Agent, or Firm*—Brian A. Lemm; Michael E. Melton

(57) ABSTRACT

The invention is a method and system of capturing a destination address from a label print stream in a data processing system which is capable of supporting an object oriented programming environment. The method begins with the initiation of a print stream from a label application. A virtual driver is selected as the intended destination device of the print stream. The virtual driver directs the print stream to a print intercept automation server (PIAS). The PIAS causes the system to display on a monitor a print field selection. The system operator selects an envelope print field from the print intercept automation server. The envelope print field is a set of objects established in the object oriented environment and comprises a mailpiece OCX and an indicia printing control object. The print stream is then parsed to extract a set of address data defining a destination address from the print stream by the print automation server. The parsing routine comprises instructions which control parsing the print stream to identify address data resident in the print stream. The instructions further facilitate the compiling of an address list comprising the address data. The parsed address data is then applied to the selected envelope print field; and the envelope is then printed.

12 Claims, 3 Drawing Sheets

U.S. PATENT DOCUMENTS

| | | |
|---|---|---|
| 4,915,287 A | 4/1990 | Volk et al. .................... 229/70 |
| 5,007,663 A | 4/1991 | Moran .......................... 283/81 |
| 5,146,439 A | 9/1992 | Jachmann et al. |
| 5,175,691 A | 12/1992 | Baker et al. |
| 5,278,947 A | 1/1994 | Balga, Jr. et al. |
| 5,319,562 A | 6/1994 | Whitehouse |
| 5,326,181 A | 7/1994 | Eisner et al. |
| 5,387,783 A * | 2/1995 | Mihm et al. ................. 235/375 |
| 5,400,243 A | 3/1995 | Oheda et al. |
| 5,448,685 A | 9/1995 | Ogura et al. ................ 395/117 |
| 5,495,581 A | 2/1996 | Tsai |
| 5,546,577 A | 8/1996 | Marlin et al. |
| 5,583,970 A | 12/1996 | Strobel |
| 5,606,609 A | 2/1997 | Houser et al. |
| 5,621,864 A | 4/1997 | Benade et al. .............. 395/117 |
| 5,652,884 A | 7/1997 | Palevich |
| 5,657,431 A | 8/1997 | Plakosh et al. |
| 5,668,934 A | 9/1997 | Maw |
| 5,668,964 A | 9/1997 | Helsel et al. |
| 5,668,990 A | 9/1997 | Bajorinas et al. |
| 5,680,615 A | 10/1997 | Marlin et al. |
| 5,682,468 A | 10/1997 | Fortenberry et al. |
| 5,684,934 A | 11/1997 | Chen et al. |
| 5,689,703 A | 11/1997 | Atkinson et al. |
| 5,694,563 A | 12/1997 | Belfiore et al. |
| 5,696,914 A | 12/1997 | Nahaboo et al. |
| 5,706,458 A | 1/1998 | Koppolu |
| 5,710,900 A | 1/1998 | Anand et al. |
| 5,715,371 A | 2/1998 | Ahamed et al. |
| 5,717,597 A | 2/1998 | Kara |
| 5,719,776 A | 2/1998 | Haug |
| 5,869,824 A * | 2/1999 | Okada et al. ................ 235/380 |
| 6,030,132 A * | 2/2000 | Harman et al. ............... 400/62 |

* cited by examiner

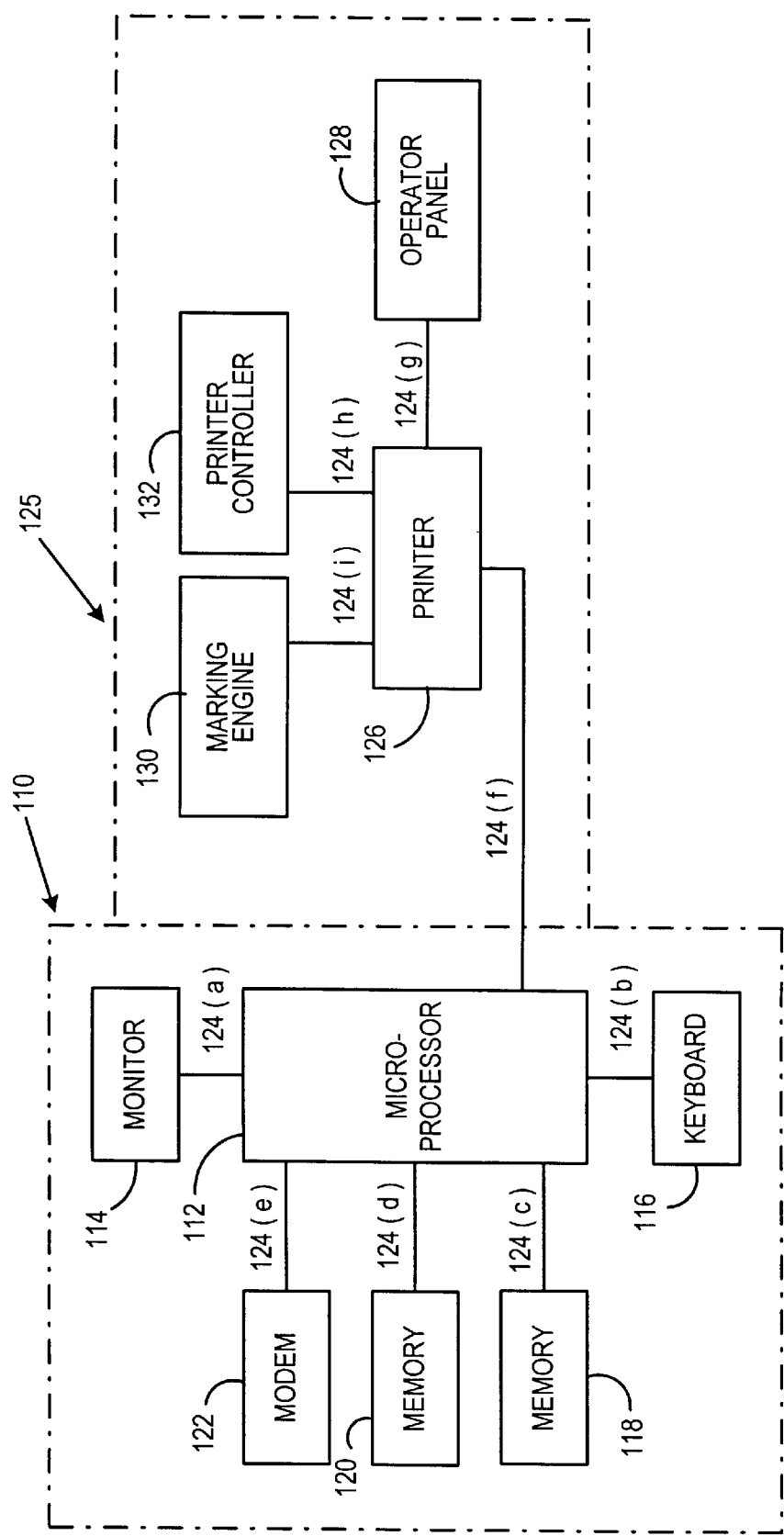

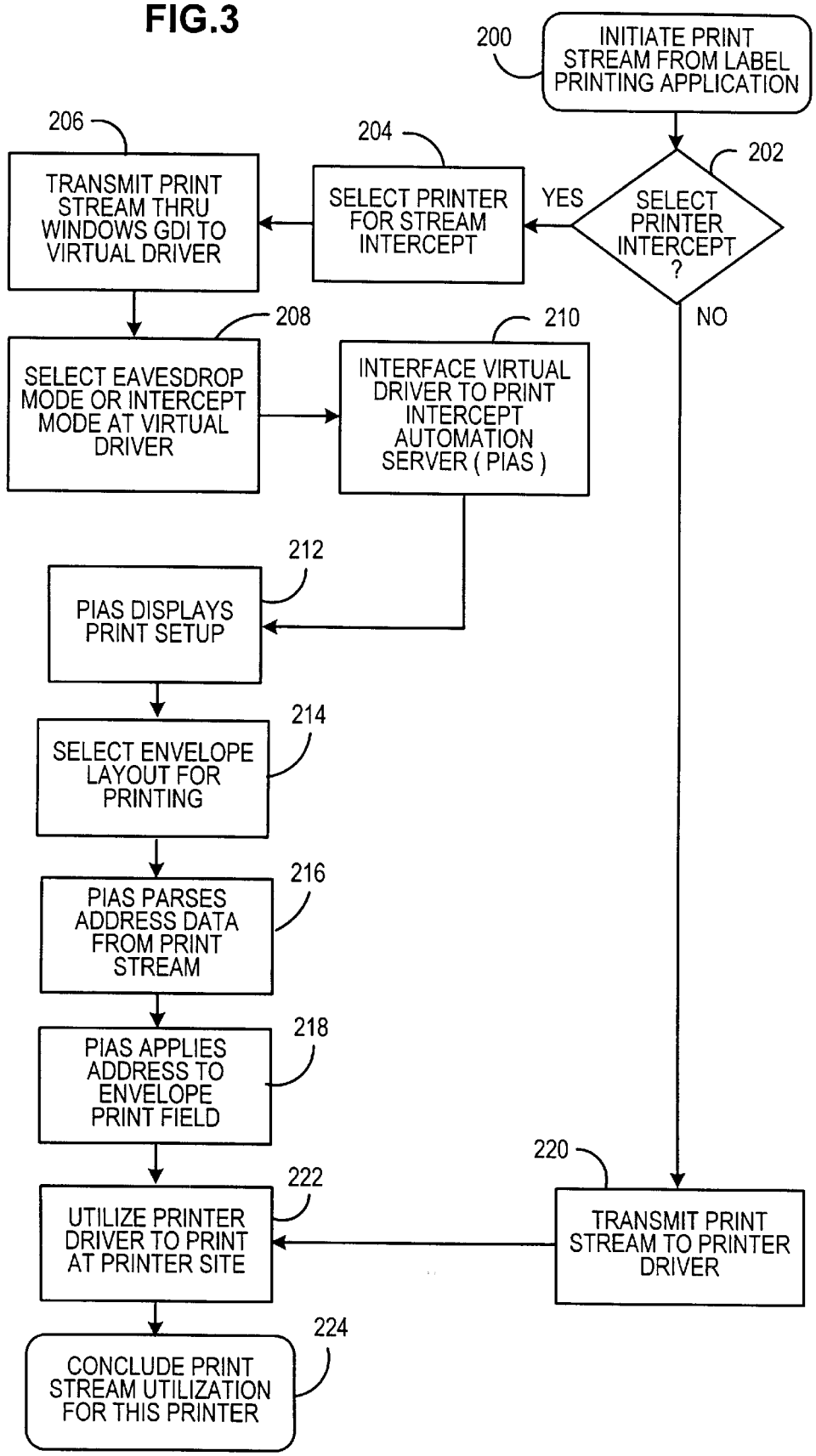

METHOD AND SYSTEM FOR CAPTURING DESTINATION ADDRESSES FROM LABEL DATA

RELATED APPLICATIONS

Reference is made to application Ser. No. 09/119,183, entitled A METHOD AND SYSTEM OF PRINT STREAM ADDRESS EXTRACTION, assigned to the assignee of this application and filed on even date herewith.

Reference is made to application Ser. No. 09/119,463, entitled A METHOD AND SYSTEM OF DISPLAYING DATABASE CONTENTS IN ENVELOPE DATA FIELDS, assigned to the assignee of this application and filed on even date herewith.

Reference is made to application Ser. No. 09/119,183, entitled A METHOD AND SYSTEM OF PRINT STREAM ADDRESS EXTRACTION, assigned to the assignee of this application and filed on Jul. 20, 1998.

Reference is made to application Ser. No. 09/119,463, entitled A METHOD AND SYSTEM OF DISPLAYING DATABASE CONTENTS IN ENVELOPE DATA FIELDS, assigned to the assignee of this application and filed on Jul. 20, 1998.

Reference is made to application Ser. No. 09/119,464, entitled A METHOD AND SYSTEM OF PRINTING POSTAGE INDICIA FROM AN ENVELOPE DESIGN APPLICATION, assigned to the assignee of this application and filed on Jul. 20, 1998.

BACKGROUND OF THE INVENTION

The print stream introduced to addressing systems and printing systems is generally in the form of an address list, though it may take on other forms. The list must be parsed and checked before format correction and barcoding techniques can be directed to the addresses on the list before creation of a mailpiece.

The print stream generated by a label application often can generally not be printed directly to envelope design or printing applications; therefore, a method and system of transforming a print stream of mailing labels to a print stream for use by an envelope application is of great use in an environment where the face of the mailpiece often determines speed and postal rate discounting.

An address database provides a link to prospective customers by creating the ability for a list user to reach out to those customers represented by the database's individual addresses. The value of the database is measured in terms of the discounts available for the sending of mailpieces, the scope of the target audience, the detail, and accuracy of an individual address. The value is thus derived from the detail found in its contents.

There is thus great value in assembling files for a database where the files are "complete" in detail. The ability to ensure detail of files within an address database has been taught in such prior art as U.S. Pat. No. 5,668,990 for an APPARATUS AND METHOD FOR GENERATING 100% UNITED STATES POSTAL SERVICE BAR CODED LISTS issued Sep. 16, 1997 to Bajorinas et al. (hereinafter referred to as Bajorinas) and assigned to the assignee of the present claimed invention.

Bajorinas disclosed a method and apparatus for generating a coded address list. The method is initiated by inputting an address list to a data processing device which then reads each address record on the address list. As an address record is read, a set of rules is applied to the record to determine whether or not a corresponding bar code can be assigned. If a bar code can be assigned, then the data processing device writes the address record and its corresponding bar code to a first list. If, however, a corresponding bar code is not determined for an address record, then the unmatched address record is posted to a second list. The first list is output for printing, while the second list is saved to memory. With respect to the second list, the system operator can: manually correct an address record on the list; delete the address record; or, output the address record to a printer for non-discounted mailing.

Refinement to file contents within an address database can be further made by employing methods disclosed in such prior art as U.S. Pat. No. 5,799,302 for a METHOD AND SYSTEM FOR MINIMIZING ATTRIBUTE NAMING ERRORS IN SET ORIENTED DUPLICATE DETECTION issued Aug. 25, 1998 to Robert J. Johnson et al. (hereinafter referred to as Johnson) and assigned to the assignee of the present claimed invention.

Johnson disclosed a method and system for detecting duplicate records on a list or in a file. The method steps include entering a list, comprised of one or more records, to a data processing system; then, applying a nickname lookup table to the records to determine a common first name. Once a common name has been determined, the method matches a first record from the list with a second record from the list by comparing the fields of the first record with the fields of at least one other record; the comparison is based on a set of pre-determined criteria. The matching sequence determines a duplicate set, wherein the duplicate set is comprised of at least two records with fields that match. The method then lists matching records sequentially so that the system can create a new record by filling each empty field with a next available corresponding field from a subsequent record within the duplicate set. The newly created record is then retained on the original list; and the duplicate records are placed on a second list. Pre-sorting of the list can occur just prior to the matching sequence as well as just prior to outputting the final list. Additionally, the system operator can be given a number of options to provide flexibility. These options can include: manually correcting a record on the duplicate records list; deleting an address record from the list of duplicates; or, outputting the record.

The value of the perfected files in the address database become readily apparent when the lists are printed to media when forming individual mailpieces to which postage is to be applied. The postal discounts available to the postal service customer are calculated by mailpiece production systems and are therefore only as good as the value of the data input to the system.

Mailpiece production systems are known in the art and have developed with changes in postal service regulations (such as those of the United States Postal Service, or USPS) and with the proliferation of appropriate software applications. In turn, this production has served the need to automate and accelerate to accommodate growth.

As the USPS, together with the postal services of other countries around the world, moves toward more fully automated mail handling in an effort to contain costs while processing ever increasing volumes of mail, automated equipment which sorts and processes mail on the basis of machine readable postal codes, such as the "zip code" or other forms of postal coding, play an ever more significant role. In the United States, postal service regulations provide for a "Postnet" bar code which represents the five, nine, or eleven digit zip code of the destination address in a machine readable form. 4-State can be utilized within Canada.

Systems have been used or proposed to meet the need to produce mail pieces imprinted with the Postnet bar code, and to enable mailers to obtain the benefit of the discounts offered for such mail. One such system is described in U.S. Pat. No. 4,858,907, for a SYSTEM FOR FEEDING ENVELOPES FOR SIMULTANEOUS PRINTING OF ADDRESSES AND BAR CODES, issued to Eisner et al. (hereinafter referred to as Eisner-1) on Aug. 22, 1989. This patent discloses a system for printing envelopes with addresses, zip codes, and corresponding bar codes. The system is controlled by a computer which includes software for converting a zip code included in the address into bar code form and then adding the bar code representation to the material to be printed on the envelope.

Another example of the art is found in U.S. Pat. No. 5,326,181 for an ENVELOPE ADDRESSING SYSTEM ADAPTED TO SIMULTANEOUSLY PRINT ADDRESSES AND BAR CODES; issued on Jul. 5, 1994 to Eisner et al. (hereinafter referred to as Eisner-2). This patent teaches a method of addressing substrates with a human readable address containing a zip code and a bar code corresponding to the zip code. The method utilizes a computer and comprises several steps. These steps include: receiving in the computer a plurality of addresses, with pre-existing zip code information contained in each as complete address data, and requiring no manual inputting or identification; automatically scanning the address data in the computer to find the pre-existing zip code; automatically converting, in the computer, the pre-existing zip code into a line of corresponding bar code; and, essentially simultaneously printing the complete address, including zip code information and corresponding bar code, on a substrate, under control of the computer so that the substrate produced has human readable zip code and machine readable bar code information thereon.

Additionally, a system for printing envelopes with addresses including bar code is disclosed in commonly assigned U.S. Pat. No. 5,175,691 for a SYSTEM AND METHOD FOR CONTROLLING AN APPARATUS TO PRODUCE ITEMS IN SELECTED CONFIGURATIONS; issued on Dec. 29, 1992 to Baker et al. (hereinafter referred to as Baker), which describes a system for printing mail pieces which includes a printer for printing sheets and envelope forms and a folder-sealer mechanism for folding the envelope form around the sheets to form a mail piece, and a computer based control system for controlling the printer and folder. In the system of this application, when an operator is creating a file of letters to be printed, the operator may designate a selected field within each letter as containing the destination address. The system will then extract the information in this designated field and with it create a new page of material to be printed on the envelope form; and, if the address within the designated field includes a zip code, the system will add a corresponding barcode to the new page. The system then adds this new page to the file before the file is output.

U.S. Pat. No. 5,278,947 for a SYSTEM FOR AUTOMATIC PRINTING OF MAIL PIECES; issued Jan. 11, 1994 to Balga, Jr. et al. (hereinafter referred to as Balga), and assigned to the assignee of the present claimed invention, is for a system which includes a printer for printing text in response to the input of signals. The printer has a capability to selectively print either sheets or envelopes. The system further includes a controller for output of a sequence of signals representative of materials to be printed on a sheet which forms part of the mail piece, where the sequence includes a subset of signals representative of an address.

In accordance with another aspect of the Balga invention, the system includes a scanning mechanism for identifying a character string which conforms to a valid postal coding standard. The system further includes a mechanism for identifying the character string as a valid postal code. Additionally, the system forms the destination address to include a line including the postal code and a selected number of proceeding lines of text.

The ability to structure software coding is extremely important when linking data to be downloaded to a printer being utilized in the addressing environment. U.S. Pat. No. 5,583,970 for a PRINTER COMMAND SET FOR CONTROLLING ADDRESS AND POSTAL CODE PRINTING FUNCTIONS, issued Dec. 10, 1996 to Strobel (hereinafter referred to as Strobel), and assigned to the assignee of the present claimed invention, is instructive in this respect.

Strobel is a method and system for printing images to a substrate wherein the commands normally input by an operator, or resident within the printer, can be determined at a host data processor. The system can control address and postal code printing functions beginning at the host computer together. The system will derive printing data, including address data, from a selected application resident in the host computer. The host computer creates and then transmits printer command sets and printing data, via transmitting means to a microprocessor within the printer. The microprocessor drives a language interpreter which directs the printer commands to a parsing step for determining the address location from within the data to be printed. The language interpreter then assigns delivery point digits to a zip code that was isolated from the transmitted address data. The newly created zip code is then matched with the bar code data stored within the microprocessor's corresponding memory. A bar code corresponding to the new zip code is selected. The language interpreter then directs the printer's controller to prepare to print the address with its corresponding zip code, any graphics images that may have been included within the print data, and text, if any. The printer controller positions the bar code for printing, and then prints the bar code and address data, zip code, and any graphics images and text to an envelope or other substrate.

Thus, Strobel overcame the limitations of the prior art by providing flexibility in determining what data, and how much, may be downloaded for printing to a substrate. Flexibility is accomplished by controlling address and postal coding functions in the printer from a host computer. The invention thus simplifies the firmware required in a selected printer, or can allow the performance of additional tasks or provide for greater database functionality, under the direction of the printer microprocessor. Thus, printer ROM memory can be reduced or freed up for other tasks, and RAM memory can be increased to handle more detailed data.

A particular limitation to current methods and systems, however, is found in the assembly of the address database which fuels the prior art detailed above. Mailpiece production systems and methods of perfecting database files must have raw material in the form of an address file. The current methods of identifying such raw material are limited to direct input by a system operator or by parsing of data in list formats.

Therefore, it is an object of the present invention to provide for a method and system for determining and extracting an address from a label print stream that can be utilized within in an envelop printing routine.

SUMMARY OF THE INVENTION

The invention is a method and system of capturing a destination address from a label print stream in a data processing system which is capable of supporting an object oriented programming environment. The data processing system further comprises: a microprocessor for manipulating data; a print stream application operatively connected to said microprocessor for creating said label print stream; and, transmission means for transmitting said print stream to said virtual driver.

The method begins with the initiation of a print stream from a label application. A virtual driver is selected as the intended destination device of the print stream. The virtual driver, in turn, directs the print stream from the virtual driver to a print intercept automation server (PIAS). The PIAS causes the system to display on a monitor for viewing by a system operator a print field selection and comprises a print field display routine.

The envelope print field is a set of objects established in the object oriented environment and comprises a mailpiece OCX and an indicia printing control object.

The system operator selects an envelope print field from the print intercept automation server. The print stream is then parsed to extract a set of address data defining a destination address from the print stream by the print automation server. The address parsing routine further selects an address parsing module which comprises parsing instructions. The parsing instructions comprise instructions which control parsing the print stream to identify address data resident in the print stream. The instructions further facilitate the compiling of an address list comprising the address data. The parsed address data is applied to the selected envelope print field; and the envelope is then printed.

BRIEF DESCRIPTION OF THE DRAWINGS

FIG. 2A is a block diagram of the system of the present invention and shown as two subsystems.

FIG. 3 is a detailed flowchart of the method of the present invention from print stream initiation to print field printing.

DETAILED DESCRIPTION OF THE PREFERRED EMBODIMENTS

Figure 1:
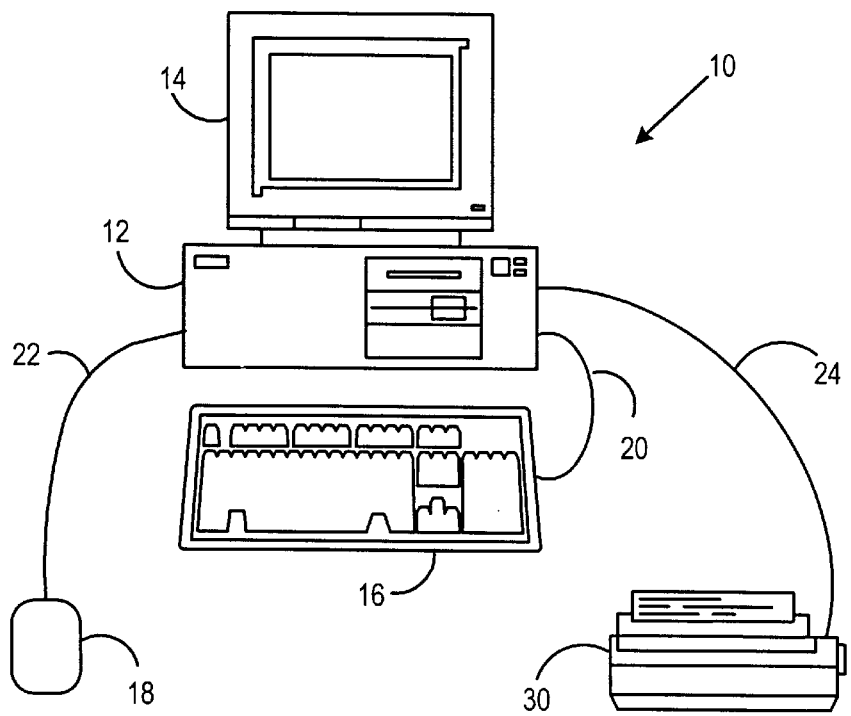
FIG. 1 is a diagram of a host system which is capable of supporting the method of the present invention.

Turning to FIG. 1, there is shown a stand-alone system environment in which the subject claimed invention can be utilized.

A stand-alone system, such as host system 10, which intercepts a print stream, has a central processing unit (CPU) 12 interoperatively connected to a monitor 14.

CPU 12 initiates the print stream in an appropriate application, then passes the print stream through a Graphical Device Interface to a virtual driver where a system operator can select from at least two data interface modes. The selected data interface mode interfaces with an address parsing application or data extraction module resident in CPU 12 which parses the print stream to identify address data resident in the print stream, or extracts data from the print stream based upon pre-determined extraction criteria. The identified address data or extracted data file is then saved in a database located within CPU 12 for future use. Input devices can be interoperatively connected or interfaced to CPU 12 as appropriate. Monitor 14 allows a system operator to view transactions occurring within the CPU 12. CPU 12 is further connected to: a keyboard 16 for data input via interface cable 20; a modem 18 for data transmission or reception via interface cable 22; and, a printer 30 for print stream data output via interface cable 24.

Turning to FIG. 2A, there are depicted in block form two subsets that, combined, form an addressing system. The addressing system can act as a host system such as that depicted in FIG. 1, or can act as the initiating system for the print stream while supporting the virtual driver. Thus, the initiating application and the virtual driver applications are remote to each other though co-located within the same stand-alone data processing system.

Addressing subsystem 110 includes: microprocessor 112 connected to monitor 114 by interface cable 124a; keyboard 116 connected to microprocessor 112 by interface cable 124b; memory 118 operatively connected to microprocessor 112 at 124c; memory 120 operatively connected to microprocessor 112 at 124d; modem 122 connected to microprocessor 112 by interface cable 124e; and, interface cable 124f for connection to addressing subsystem 125.

Addressing subsystem 125 includes: printer 126 connected to addressing subsystem 110 by interface cable 124f; operator panel 128 operatively connected to printer 126 at 124g; printer controller 132 operatively connected to printer 126 at 124h; and, marking engine 130 operatively connected to printer 126 at 124i.

Figure 2B:
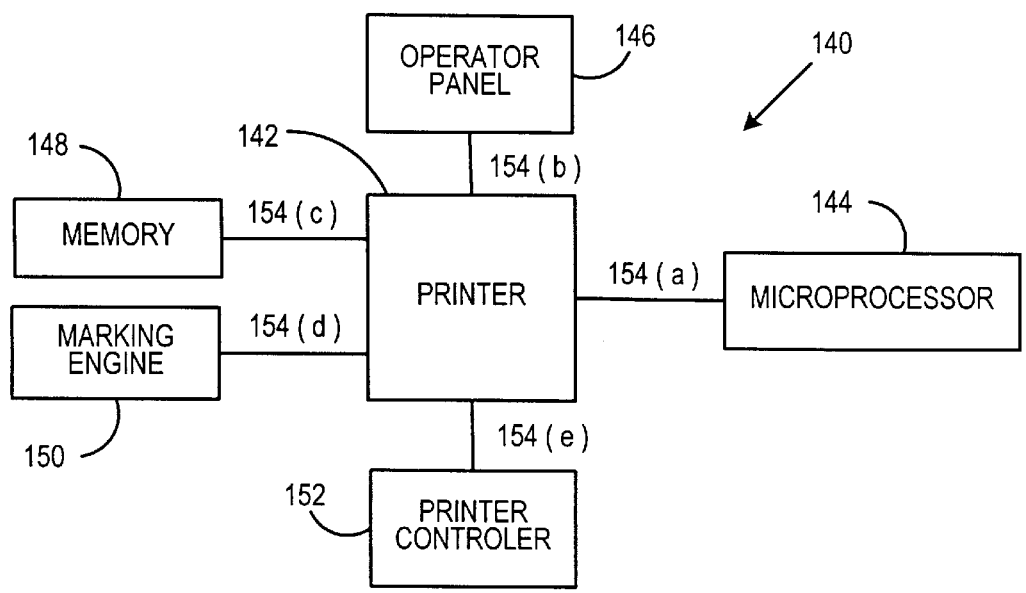
FIG. 2B is a block diagram of an addressing printer which is capable of employing the method of the present invention.

A microcomputer, or any computer that can download data that can be printed on a printer whether that printer is a peripheral device of the computer or not, uses application programs for creating data. These are resident in the microcomputer ROM memory and in memory 118; memory 120 is utilized for the storing of address lists. The printers commonly utilized in the addressing art may also contain a microprocessor that is able to assign bar code data to addresses that are delivered from the host. These so-called "smart" printers vary in their ability to process data. FIG. 2B is a block diagram of a smart printer which can serve as an alternative host for the invention claimed herein.

Turning to FIG. 2B, system 140 is depicted as comprising: printer 142 which is operatively connected to microprocessor 144 at 154a; operator panel 146 operatively connected to printer 142 at 154b; memory 148 operatively connected to printer 142 at 154c; marking engine 150 operatively connected to printer 142 at 154d; and, printer controller 152 operatively connected to printer 142 at 154e.

Turning to FIG. 3, there is shown a flowchart of the method of the present invention wherein an address is determined from a print stream and retained in a memory for future use.

FIG. 3 begins at step 200 with the initiation of the print stream from a label printing application. From step 200 the method advances to a query at step 202.

The query at step 202 asks whether or not the host system 10 is to intercept a print stream. If the response to the query is "NO," then the method advances to step 220 where the print stream is transmitted to the printer driver. From step 220, the method utilizes, at step 222, the printer driver to print the print stream at the selected printer site. It should be noted that the print stream environment can have more than one printer 30 available for outputting the print stream. In the case of multiple available printers, a particular printer is selected for downloading of the print stream. Upon printing the individual print stream at step 222, the print stream utilization for the printer is concluded, at step 224, until such time as a subsequent print stream is directed to the printer.

Returning to the query at step 202, if the response to the query is "YES," then the method advances to step 204 where a particular printer destination is selected for print stream interception. The method then advances to step 206 where the print stream is tramsmitted through a Windows® Graphical Device Interface (GDI) to a "virtual driver."

The virtual driver can operate on one of two interface modes; these are the eavesdrop mode and the intercept mode. The virtual driver is disclosed in detail in co-pending U.S. application Ser. No. 09/119,183, entitled A METHOD AND SYSTEM OF PRINT STREAM ADDRESS EXTRACTION and filed on Jul. 20, 1998.

The eavesdrop mode allows the virtual driver to pass the print stream through to the printer while producing a duplicate copy of the print stream for transmission to a server. The server is further linked to an address parsing module for parsing the print stream. The intercept mode, on the other hand, allows the virtual driver to pass the print stream directly to the server without making a duplicate copy; the server is further linked to the address parsing module for parsing the print stream. In a preferred embodiment, the server is an OLE automation server which in turn will pass the print stream to an output device such as a printer or monitor via an interface cable or similar link. The mailpiece OCX is disclosed in detail in co-pending U.S. application Ser. No. 08/997,696 filed Dec. 23, 1997, entitled OLE AUTOMATION SERVER MANIPULATION OF MAIL PIECE DATA.

The method advances from step 206 to step 208 where either the eavesdrop or the intercept mode is selected by the system user. The modes could be predetermined as well by the system user. The system then proceeds to step 210 where the virtual driver is interfaced with a Print Intercept Automation Server (PIAS). The PIAS displays the print setup in graphic form to the system operator at step 212.

From step 212, the method advances to step 214 where the envelope layout is selected for printing. The PIAS then parses out the address data from the print stream at step 216 before the method advances to step 218 where the PIAS applies the parsed address data to the envelope print field. The method then advances to step 222 where the system utilizes the printer driver to print the envelope at the printer site. Upon printing the individual print stream at step 222, the print stream utilization for the printer is concluded, at step 224, until such time as a subsequent print stream is directed to the printer.

The indicia control object utilized herein is disclosed in detail in co-pending U.S. application Ser. No. 09/119,464, entitled A METHOD AND SYSTEM FOR CAPTURING DESTINATION ADDRESSES FROM LABEL DATA, and filed on Jul. 20, 1998.

While certain embodiments have been described above in terms of the system within which the address object methods may reside, the invention is not limited to such a context. The system shown in FIG. 1 is an example of a host system for the invention, and the system elements are intended merely to exemplify the type of peripherals and software components that can be used with the invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of capturing a destination address from a label print stream in a data processing system comprising the steps of:

(a) initiating a print stream from a label application;
   (b) selecting a virtual driver as the intended destination device of said print stream;
   (c) directing said print stream from said virtual driver to a print intercept automation server;
   (d) displaying on a monitor for viewing by a system operator a print field selection;
   (e) selecting an envelope print field from said print intercept automation server;
   (f) parsing a set of address data defining a destination address from said print stream by said print intercept automation server;
   (g) applying said parsed address data to said selected envelope print field; and
   (h) printing said envelope.

2. The method of claim 1, wherein said data processing system is capable of supporting an object oriented programming environment.

3. The method of claim 2, wherein said envelope print field is a set of objects established in said object oriented environment comprising a mailpiece OCX and an indicia printing control object.

4. The method of claim 1, wherein said print intercept automation server is an application comprising a print field display routine.

5. The method of claim 1, wherein said label application comprises a subset of said data processing system wherein said subset further comprises:

(a) a microprocessor for manipulating data;
   (b) a print stream application operatively connected to said microprocessor for creating said label print stream; and
   (c) transmission means for transmitting said print stream to said virtual driver.

6. The method of claim 1, wherein said address parsing routine further performs the steps of:

(a) selecting said address parsing module wherein said address parsing module comprises parsing instructions;
   (b) parsing said print stream to identify address data resident in said print stream in accordance with said parsing instructions; and
   (c) compiling an address list comprising said address data.

7. The method of claim 1, wherein said print intercept automation server is defined by an object established in said object oriented environment and resident in said data processing system.

8. A system for capturing a destination address from a label print stream comprising:

(a) a label application for initiating a label print stream;
   (b) a virtual driver for selection as the intended destination device of said label print stream;
   (c) data directing means for directing said print stream from said virtual driver to a print intercept automation server;
   (d) display means for viewing by a system operator a print field selection;
   (e) selecting means for selecting an envelope print field from said print intercept automation server;
   (f) a print stream parsing routine for parsing a set of address data defining a destination address from said print stream by said print automation server;

(g) application means for applying said parsed address data to said selected envelope print field; and (h) printing means for printing said envelope print fields to an envelope.

9. The system of claim 8, wherein said printing means is an addressing printer linked to said indicia control object.

10. The system of claim 8, wherein said address parsing routine further performs the steps of:

(a) selecting said address parsing module wherein said address parsing module comprises parsing instructions;

(b) parsing said print stream to identify address data resident in said print stream in accordance with said parsing instructions; and (c) compiling an address list comprising said address data.

11. The system of claim 8, wherein said parsed address data comprises a set of files wherein each of said set of files is representative of a destination address.

12. The system of claim 11, wherein said destination address is printed to an envelope.

\* \* \* \* \*